United States Patent [19]

Nagano et al.

[11] Patent Number: 5,778,421
[45] Date of Patent: Jul. 7, 1998

[54] INFORMATION PROCESSING SYSTEM WHICH CAN CHECK DISK-LIKE STORAGE MEDIUM HAVING PRESCRIBED RELATION THEREWITH AND DISK-LIKE STORAGE MEDIUM THEREFOR

[75] Inventors: Masakazu Nagano; Kunihiro Tanaka; Toshiro Hibino; Hiroshi Sato, all of Kyoto, Japan

[73] Assignee: Nintendo Co., Ltd., Kyoto, Japan

[21] Appl. No.: 642,672

[22] Filed: May 3, 1996

Related U.S. Application Data

[63] Continuation-in-part of Ser. No. 155,780, Nov. 23, 1993, Pat. No. 5,550,999.

[30] Foreign Application Priority Data

Nov. 26, 1992 [JP] Japan .................. 4-341164

[51] Int. Cl.⁶ .................................................. G06F 12/00
[52] U.S. Cl. .................. 711/115; 395/182.09; 395/821; 463/10; 380/4
[58] Field of Search .............. 395/182.09, 821; 711/115; 380/4; 463/10

[56] References Cited

U.S. PATENT DOCUMENTS

| | | | |
|---|---|---|---|
| 4,799,635 | 1/1989 | Nakagawa | 711/115 |
| 4,891,504 | 1/1990 | Gupta | 235/462 |
| 5,070,479 | 12/1991 | Nakagawa | 395/182.09 |
| 5,134,391 | 7/1992 | Oakada | 340/799 |
| 5,265,888 | 11/1993 | Yamamoto | 463/10 |
| 5,357,604 | 10/1994 | San et al. | 463/31 |
| 5,393,073 | 2/1995 | Best | 463/35 |
| 5,418,852 | 5/1995 | Itami et al. | 380/4 |
| 5,426,762 | 6/1995 | Nakagawa | 711/115 |
| 5,473,595 | 12/1995 | Hayashi et al. | 369/124 |
| 5,552,799 | 9/1996 | Hashiguchi | 345/3 |
| 5,584,029 | 12/1996 | Izui et al. | 395/750.01 |

FOREIGN PATENT DOCUMENTS 6-161902   11/1992   Japan .

Primary Examiner—Christopher B. Shin
Attorney, Agent, or Firm—Nixon & Vanderhye P.C.

[57] ABSTRACT

This is invention provides an information processing system for a disk-like storage medium such as flexible magnetic disks or a DVD-RAMs. The disk-like storage medium stores a first data including at least image data, and a second data for deciding legitimacy of the image data, while a case containing the disk-like storage medium comprises a non-volatile storage device for storing a third data having a predetermined relationship with the second data and storing a fourth data for identifying a location in the disk-like storage medium at which the second data is stored. Whne a predetermined relationship between the second and third data is confirmed, the disk-like storage medium is allowed to be used.

16 Claims, 9 Drawing Sheets

INFORMATION PROCESSING SYSTEM WHICH CAN CHECK DISK-LIKE STORAGE MEDIUM HAVING PRESCRIBED RELATION THEREWITH AND DISK-LIKE STORAGE MEDIUM THEREFOR

This is a continuation-in-part application of patent application Ser. No. 08/155,780 filed on Nov. 23, 1993, now U.S. Pat. No. 5,550,999

BACKGROUND OF THE INVENTION

1. Field of the Invention

The present invention relates to an information processing system which can check a secondary storage medium having a prescribed relation with the information processing system and a secondary storage device therefor, especially to an information processing system such as a video game machine, a personal computer or the like which can prevent illegitimate reproduction of a secondary storage medium to which a user can write data such as a flexible disk, a digital versatile disk, a magneto-optic disk or the like.

2. Description of the Prior Art

In an information processing system such as a video game machine using a secondary storage medium such as an optical disk storing a game program or the like, it is required to prevent illegitimate reproduction of a disk-like storage medium. If a magnetic disk such as a flexible disk is used for a game machine, it can be reproduced illegitimately by a personal computer. Then, it is desired that legitimacy of a secondary storage medium is checked surely.

Further, if a secondary storage medium such as an optical disk is used for a video game machine or the like, the storage capacity of CD-ROM is very large and a game can be played for a long time. Then, a user is required to save backup data at the end of each play in a cartridge for the CD-ROM. In such a case, if a CD-ROM for a different game is set in a case of the video game machine when the same game is intended to be started again, the backup data for a different game are written erroneously in the disk cartridge. Therefore, it is needed to prevent the inconsistency of the CD-ROM and the backup data.

Disk-like media to which a user can write or rewrite data are also used as secondary storage media. Such disk-like media include a magnetic disk such as a flexible disk, and an optical disk such as a digital versatile disk of RAM type (DVD-RAM) or a magneto-optical disk (MO). Because data can be written thereto by a user, the storage media may be copied illegitimately with a personal computer in a large amount at a very cheap cost. However, authenticy of copies of such disk-like storage media cannot be determined previously.

U.S. Pat. No. 4,799,635 and Japanese Patent laid open Publication 2-31256/1990 (first and second prior arts) of the present applicant disclose techniques for preventing illegitimate reproduction of a program stored in a secondary storage medium. In the technique described in the first prior art, a master semiconductor element is installed in an image processor such as a video game machine, while a slave semiconductor element having a prescribed relation with the master one is installed in an external storage device such as a ROM cartridge attached to the video game machine. The master semiconductor element exchanges data with the slave one, and when the exchanged data are decided to have a prescribed relation, the central processing unit included in the image processor is activated. Thus, the legitimacy is decided by confirming that an external storage device does not include a slave semiconductor element which has the prescribed relation with the master one. If it is decided that an external storage device does not include a slave semiconductor element which has the prescribed relation, the external storage device cannot be used.

As to an external storage device wherein a secondary storage medium can be set in or removed from a case, the above-mentioned first prior art has a problem that the legitimacy of a secondary storage medium cannot be decided surely if a secondary storage medium reproduced illegitimately is contained in a case with a true slave semiconductor element.

In the second prior art, a part of the data in a program memory to be read for an inherent object of the program is stored in a monitor ROM in order to prevent reading data from the program memory when not used for the inherent object. If the program memory is used normally, the data sent to the address and data buses are compared with the data stored in the monitor ROM. If the comparison does not result in the agreement of the data, the bank change thereafter is not enabled.

In the above-mentioned second prior art, the legitimacy cannot be decided surely if the data read from a program memory for an inherent use includes a conditional branch. Further, the second prior art cannot be applied to a secondary storage medium such as an optical disk which is not made of a semiconductor memory because the address and data buses cannot be monitored for media other than semiconductor memories.

U.S. Pat. No. 5,134,391 of Okada assigned to Nintendo Company Limited describes a hand-held game machine wherein a use of an external ROM is not activated if it does not store a second character data for displaying a trade mark protected legally. However, if an external ROM which stores the second character data is copied illegally, it cannot be prevented to be used, and only legal countermeasures against infringement of the trade mark are possible.

SUMMARY OF THE INVENTION

An object of the present invention is to provide an information processing system comprising an information processor and a disk-like storage device wherein a disk-like storage medium to which a user can write data can be set in or removed from a case therefor, wherein only an illegitimate disk-like storage medium is allowed to be used.

An information processing system according to the present invention comprises an information processor and a storage device removably connected to the information processor. The storage device comprises a disk-like storage medium and a case. The disk-like storage medium stores a first data (including at least image data) to be processed by the information processor and a second data which is used to determine illegitimacy of the medium. The case contains the storage medium, and it comprises a non-volatile storage device and a first checking circuit. The non-volatile storage device stores a third data with a prescribed relation to the second data and a fourth data on the storage region (such as track and sector) of the second data in the disk-like storage medium. The first checking circuit compares the second data read according to the fourth data with the third data stored in the non-volatile storage device, and if the second data has a predetermined relation with the third data, the checking circuit decides that the storage medium has a predetermined relation to the case. When the second data has a predetermined relation with the third data, the disk-like storage medium is decided to be an authentic medium. Then, as described below, a central processor in the information processor activates processing according to the first data. The information processor comprises a main storage device, a central processor, write and read circuitry and an activation circuit. The main storage device stores the first and second data read from the disk-like storage medium. The write and read circuitry reads the first and second data from the disk-like storage medium and writes the read data in the main storage device. When the first checking circuit decides that the disk-like storage medium is authentic, the activation circuit enables the central processor to perform a processing according to the first data.

Thus, a use of the storage medium is activated only when the first checking circuit decides the existence of the prescribed relation on a disk-like storage medium. In other words, if a disk-like storage medium in a case is changed or rewritten so that it does not have the predetermined relation with the case, the use of the storage medium is inactivated. Then, if an optical disk such as a CD-ROM is changed or a magnetic disk such as a flexible disk is rewritten, the second data in the storage device does not have the predetermined relation with the third data in the case. Thus, the central processor is inactivated. Thus, though the disk-like storage medium is copied easily, copies produced illegitimately cannot be used in the information processor of the invention. Thus, illegitimate reproduction can be prevented electronically.

An advantage of the present invention is that a use of a disk-like storage medium copied illegitimately can be prevented effectively in an information processing system.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
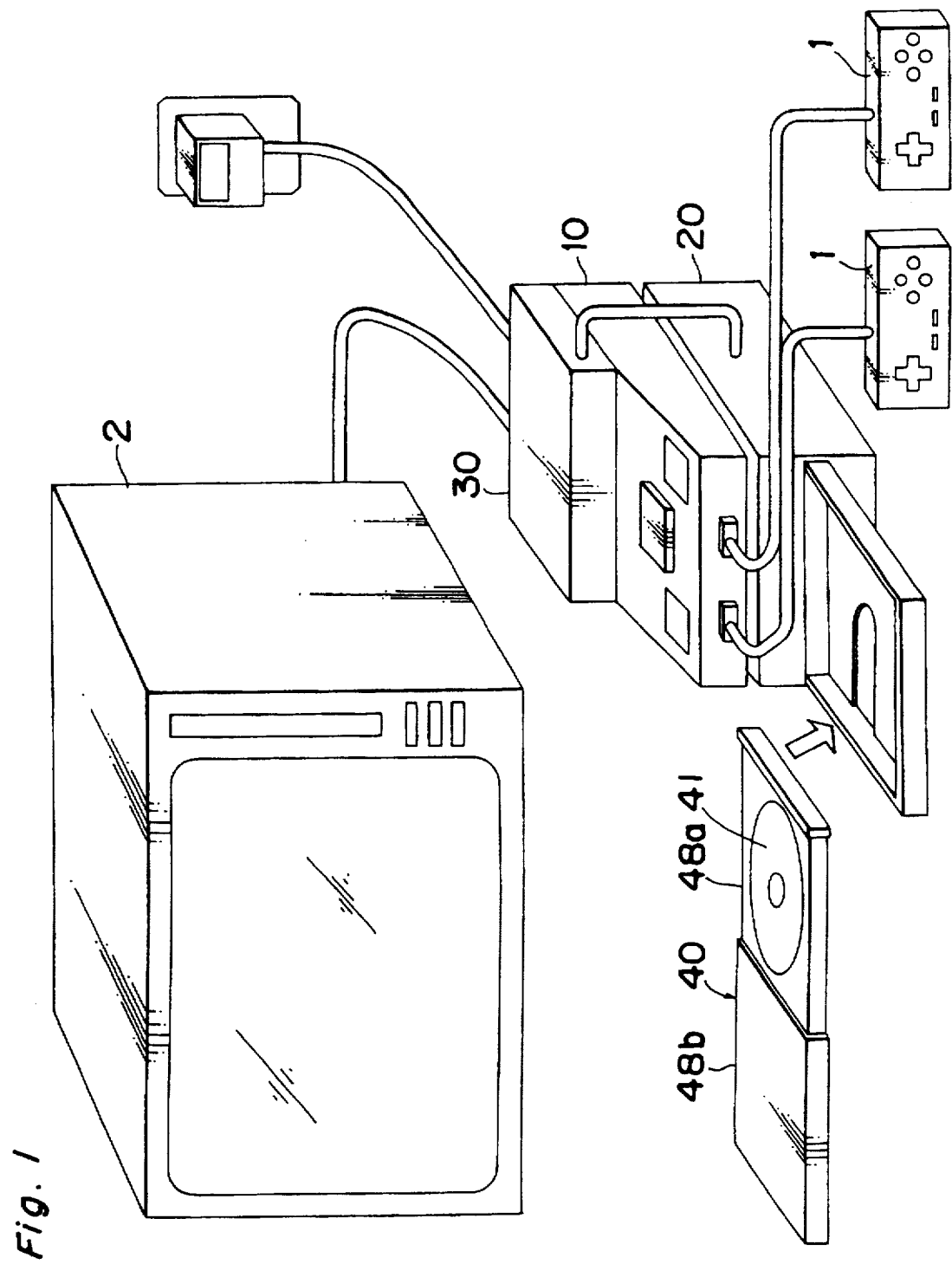
FIG. 1 is a perspective view of an information processing system of an embodiment according to the present invention.

Referring now to the drawings, wherein like reference characters designate like or corresponding parts throughout the several views, FIG. 1 shows a perspective view of an information processing system of an embodiment according to the present invention. The information processing system comprises an image processor 10, an optical reproduction unit 20 and a system cartridge 30. The image processor 10 performs picture and audio processings and the like based on data given from a ROM cartridge (not shown) or a CD-ROM (disk-like storage medium) 41. The optical reproduction unit 20 is connected to the image processor 10 via the system cartridge 30. An optical storage device (hereinafter referred to as "optical disk cartridge") 40 as an example of a secondary storage device can be connected to and disconnected from the optical reproduction unit 20. The optical disk cartridge 40 includes a cartridge case 38 comprising a tray 38a (refer FIG. 3) and a container 38b. As shown in FIG. 1, a CD-ROM 41 is set on the tray 38a to be inserted into the container 38b. Then, as shown in FIG. 1, the optical disk cartridge 40 is put in a sliding case of the optical reproduction unit 20 to be inserted inside the optical reproduction unit 20. Then, the data stored in the CD-ROM 41 can be reproduced.

Figure 2:
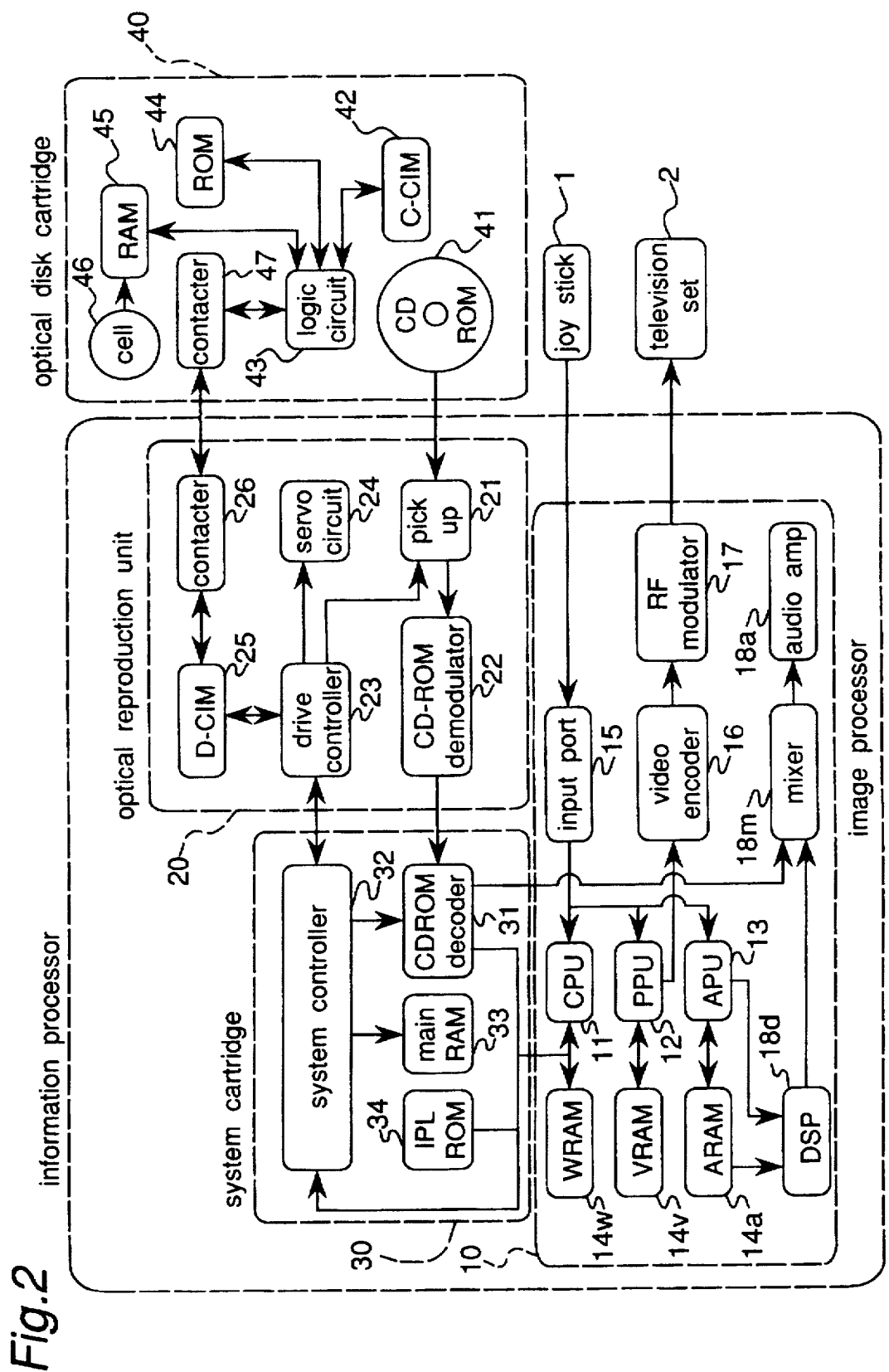
FIG. 2 is a block diagram of the information processing system.

FIG. 2 shows a block diagram of the information processing system. In the system, the image processor 10 performs picture processing and voice processing according to a program data given from a ROM cartridge (not shown) or from a CD-ROM (a secondary storage medium) 41, as in a video game machine, and it includes a central processing unit (hereinafter referred to "CPU") 11 to perform a game processing or the like. A picture processing unit (hereinafter referred to also as "PPU") 12 and an audio processing unit (hereinafter referred to also as "APU") 13 are connected to the CPU 11. The CPU 11 and the picture processing unit 12 cooperate with each other for picture processing. The CPU 11 and the audio processing unit 13 cooperate with each other for audio processing. A working RAM (W-RAM) 14w is connected to the CPU 11. A video RAM (V-RAM) 14v is connected to the picture processing unit 12. An audio RAM 14a is connected to the audio processing unit 13. An operation device (joy stick) 1 sends operation signals via an input port 15 to the CPU 11. The picture signal output of the picture processing unit 12 are sent to a video encoder 16 and to a high frequency (RF) modulator 17. A digital signal processor (DSP) is connected via address and data buses to the audio processing unit 13 and to the audio RAM 14a. The DSP 18d converts digital data to an analog signal with a waveform and frequencies for outputting a desired audio signal, and sends it via a mixer 18 and an audio amplifier 18a to an RF modulator 17. The RF modulator 17 generates a complex video signal synthesizing a video signal and an audio signal to be provided to a television set 2.

Figure 3:
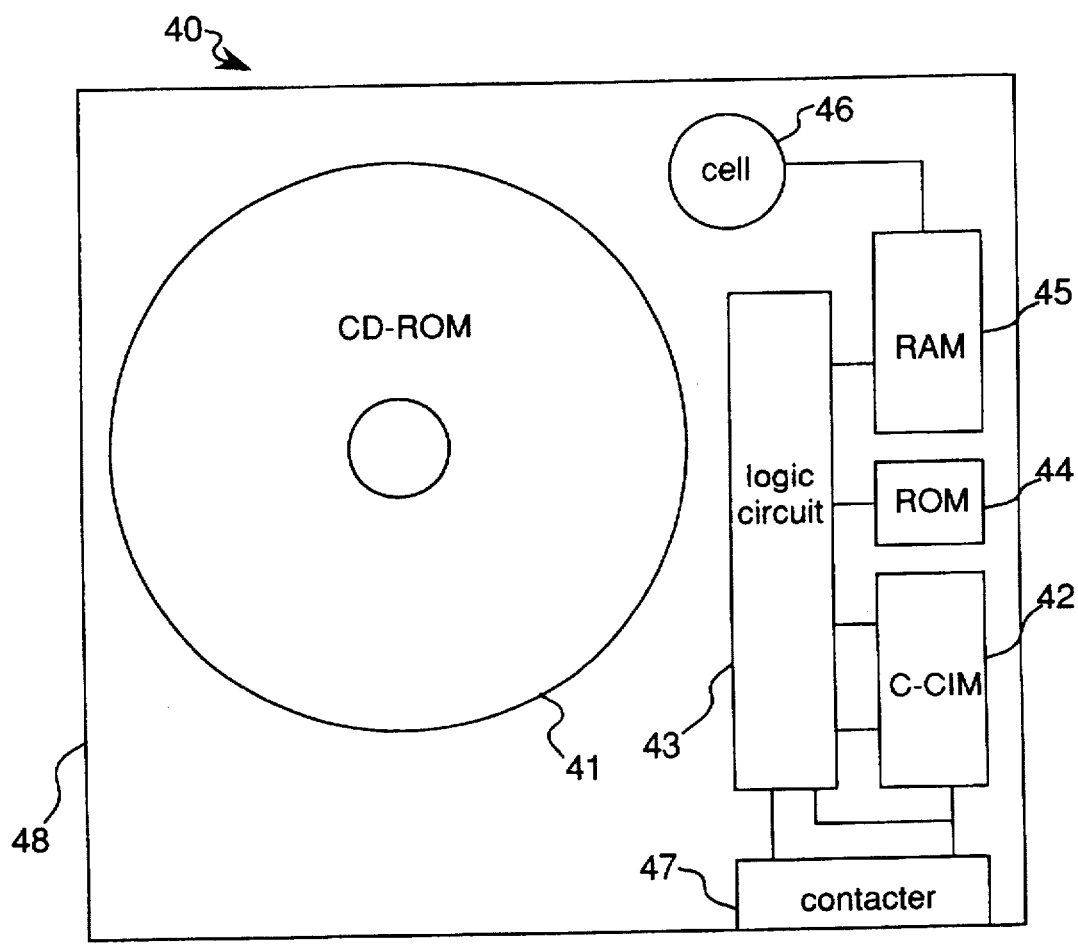
FIG. 3 is a schematic diagram of an optical disk cartridge.

FIG. 3 shows a schematic diagram of an optical disk cartridge 40 which is explained in detail with reference to FIGS. 2 and 3. The optical disk cartridge 40 comprises an optical disk (CD-ROM) 41, as an example of a secondary storage medium, which stores a large amount of data optically. The optical disk cartridge 40 includes a first security element (C-CIM) 42, as an example of the first check means, used for checking the legitimacy of the CD-ROM 41. The first security element 42 comprises a one-chip 4-bit microprocessor or the like, not shown in FIG. 3, including a CPU core, a buffer RAM and a program ROM. A logic circuit 43 is connected to the first security element 42. A non-volatile memory (such as a ROM) 44 stores a first name data (a third data) used for checking the legitimacy of the CD-ROM 41 and a name address (a fourth data) for representing the storage address (or area) of the first name data. The first name data comprises a code inherent for each cartridge case 48 which varies with a kind of CD-ROM, a maker of thereof, a person having a copy right or the like. The first name data is used to check a prescribed relation with the counterpart (a second name data) stored in the CD-ROM 41. The relation to be checked is, for example, the agreement of the two name data or of two data obtained after a prescribed operation such as check cum of the two name data. A read and write memory (RAM) 45 is connected to the logic circuit 43 in order to store backup data on the points, the progress report and the like during a game. The RAM 45 is backed up with a battery 46 to prevent the destruction of data. Further, a contacter (connection points) 47 is connected to the input and output terminals of the logic circuit 43 so as to provide data to the optical reproduction unit 20 through electrical contact. In the embodiment, the CD-ROM 41 is enclosed in a cartridge case 48 so that the CD-ROM 41 can be contained into or removed from the cartridge case 48. The cartridge case 48 comprises a first security element 42, a logic circuit 43, a ROM 44 and a RAM 45 fixed as one body to the cartridge case 48 so that the contacter 47 can be exposed with a shutter (not shown). If necessary, the first security element 42, the logic circuit 43 and the ROM 44 may be integrated in a one-chip integrated circuit.

By referring again to FIG. 2, the optical reproduction unit 20 comprises a pick-up 21 for reading optically the storage data in the optical disk (CD-ROM) 41. The pick-up 21 is provided in a position in correspondence to the CD-ROM 41 when the shutter (not shown) is opened to connect the optical disk cartridge 40 to the unit 20. The pick-up 21 reads image data, program data and acoustic data in the Reed-Solomon code or the like from the CD-ROM 41, and the data are decoded with a decoder (CD-ROM demodulator) 22 respectively. The decoded image data, program data and acoustic data are sent to a decoder (CD-ROM decoder) 31 included in the system cartridge 30. Further, the optical reproduction unit 20 comprises a drive controller 23 for controlling the position of the pick up 21. A serve circuit 24 is connected to the drive controller 23 for the revolution control of the CD-ROM 41, the movement of the pick up and the control of focusing. Further, a contacter (connection points) 26 is connected to the drive controller 23 via a second security element (D-CIM) 25 as an example of the second check means. The second security element 25 comprises a one-chip 4-bit microprocessor or the like including a CPU core, a buffer RAM and a program ROM, similarly to the security element 43. The second security element 25 has a function to decide the legitimacy of the first security element 42 and a command generation function to instruct an action of the first security element 42, and it receives a name address from the ROM 44 and a back up data from the RAM 45 to send them via the drive controller 23 to a system controller 32 to be mentioned later. The second security element 25 is used to check if the optical disk cartridge 40 including the first security element 42 has a prescribed correlation with the optical reproduction unit 20 or not, so that it can decide if the optical disk cartridge is manufactured legitimately or not.

The system cartridge 30 is inserted in a cartridge inlet (not shown) of the image processor 10 and provides picture data and audio data received from the optical reproduction unit 20 to the image processor 10. The decoder 31 included in the system cartridge 30 converts the picture data and the program data read in serial from the optical reproduction unit 20 into parallel data and sends them via a system controller 32 to the CPU 11 and decoded audio signals to the mixer 18m. A system cartridge 30 comprises the system controller 32. The system controller 32 controls the optical reproduction unit 20. Further, if the CPU 11 disables the inherent processing according to the data of the CD-ROM 41 in correspondence to the negative decision of the first security element 42 on the legitimacy of the CD-ROM 41, the system controller 30 prohibits the read of various data stored in the CD-ROM 41 eventually. The decoder 31 and the system controller 32 cooperate with the optical reproduction unit 20 to read data from the CD-ROM 41. Further, the system controller 32 functions as an activation means of the CPU 11 and cooperates with the second security element 25 and the drive controller 23 to control read and write. Further, the system cartridge 30 includes a main RAM 33 and a ROM (IPLROM) 34. The ROM (IPLROM) 34 has a storage capacity of for example 2 megabytes and stores an initial program for activating the CPU 11 before reading the data of the CD-ROM 41 and a system IO for controlling the optical reproduction unit 20 beforehand.

Figure 4:
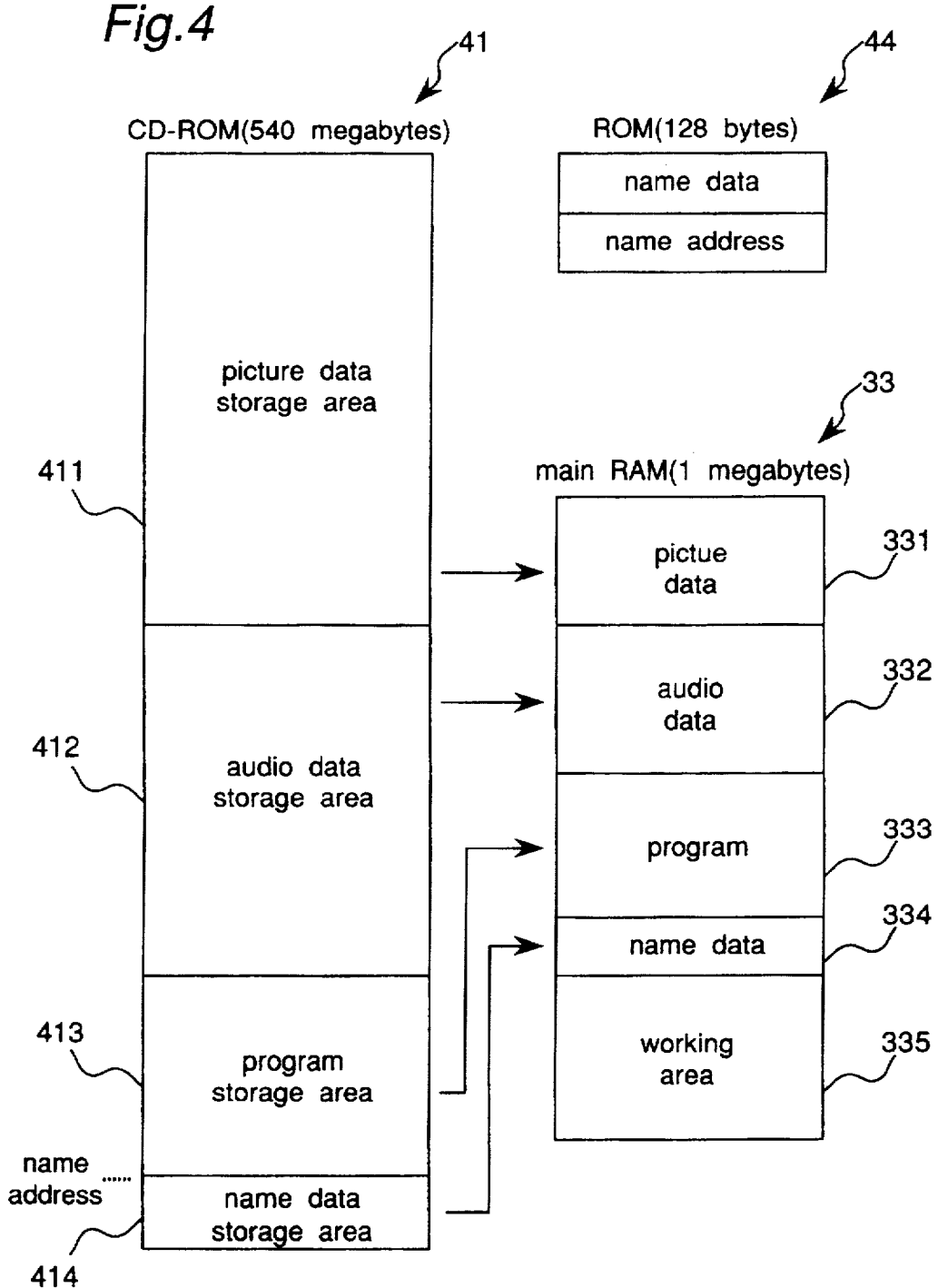
FIG. 4 is a schematic memory maps of CD-ROM 41, ROM 44 and main RAM 33.

FIG. 4 shows a schematic memory maps of the CD-ROM 41, the ROM 44 and the main RAM 33. In FIG. 4, the CD-ROM 41 has a very large storage capacity (for example 540 megabytes), and it includes a picture data storage area 411 for storing picture data, an audio data storage area 412 for storing audio data, a program data storage area 413 for storing a program data for the control of a game such as picture image display based on picture data, the generation of audio data and the like, and a name data storage area 414 for storing a second name data. The first data comprises the picture data, the audio data and the program data stored in the storage areas 411–413. The second name data comprises an inherent code of a cartridge case 48 which varies with a kind of CD-ROM 41, a maker, a person having a copy right or the like, and it is used as the second data for checking if it has a prescribed relation (such as the agreement of the name data or check sum thereof) to the name data stored in the ROM 44 for deciding the correlation to the cartridge case 48. The address for storing the name data is called as name address. The name data may also be stored in one of the storage areas 411–413. On the other hand, the name address may be changed for each cartridge case 48 so that CD-ROMs of the same game have different name data.

The ROM 44 has a storage capacity (for example 128 bytes) much smaller than the storage capacity of the CD-ROM 41 and it stores a data for checking the correlation of the CD-ROM 41 to the cartridge case 48. For example, the ROM 44 comprises an area 441 for storing the storage address (fourth data) of a second name data stored in the CD-ROM 41 and an area 442 for storing a second name data (third data) for identifying the CD-ROM 41 which can be used. Therefore, it is sufficient that the first name data stored in the area 442 in the ROM 44 has a prescribed relation (for example the agreement of the two name data or of two data obtained after a prescribed operation thereof) to the second name data stored in the storage area 414. The first name address and the name data may be coded when stored in the ROM 44. An EEP-ROM or a flash memory may be used instead of the non-volatile memory, ROM 44.

The main RAM 33 has a storage capacity (for example 1 megabytes) smaller than that of the CD-ROM 31 and but not so small to be needed to transfer data frequently for image processing. The main RAM 33 stores a unit of data needed for picture processing and audio processing temporarily according to the usage such as a game. For example, the main RAM 33 includes a storage area 331 for storing picture data, a storage area 332 for storing audio data, a storage area 333 for storing program data and a storage area 334 for storing a second name data read from the CD-ROM 41 temporarily. The main RAM 33 is used as a main storage means and it stores the first data in the storage areas 331–333 and the second data in the storage area 334.

Figure 5:
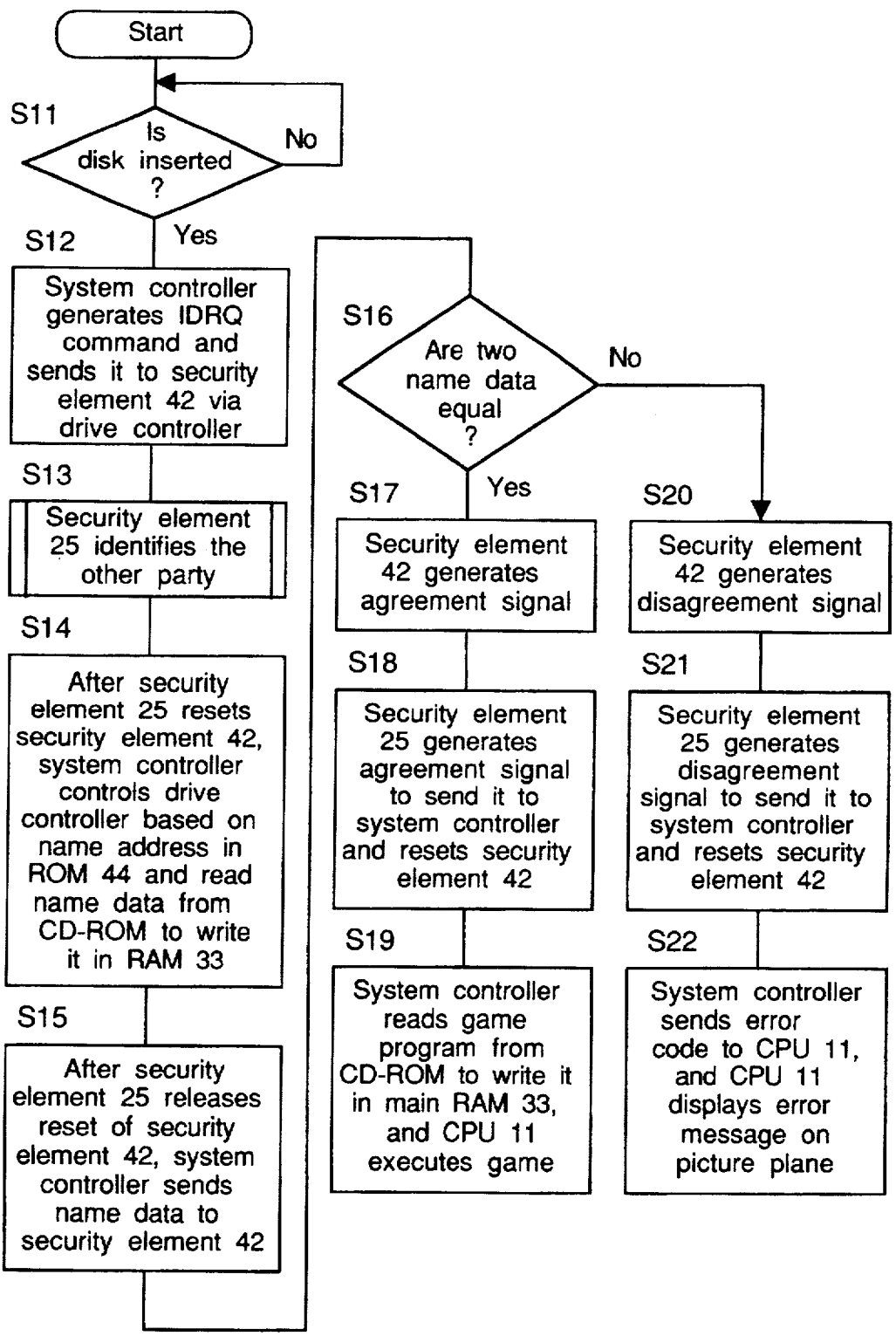
FIG. 5 is a flowchart for starting the system.

FIG. 5 shows a flowchart for starting the data processing system. That is, FIG. 5 shows a flow on the check of permission of the use of a CD-ROM 41 when the optical disk cartridge 40 containing the CD-ROM 41 is set in the optical reproduction unit 20. The system controller 32 starts the operation of FIG. 5 according to the program stored in the ROM 34.

At step S11, it is decided if an optical disk cartridge 40 is inserted in the optical reproduction unit 20. If it is decided that an optical disk cartridge 40 is not inserted, the flow waits the insertion. If it is decided that an optical disk cartridge 40 is inserted, the flow proceeds to a next step. At step S12, the system controller 32 sends a command IDRQ for requesting the identification of the other party to the second security element 25. At step S13, the second security element 25 decides if the first security element 42 having a prescribed relation to a cartridge case 48 exists or if the cartridge case 48 set in the optical reproduction unit 20 is manufactured legitimately or not. This decision is shown in detail in the flowchart shown in FIG. 6 on the identification of the other party.

Figure 6:
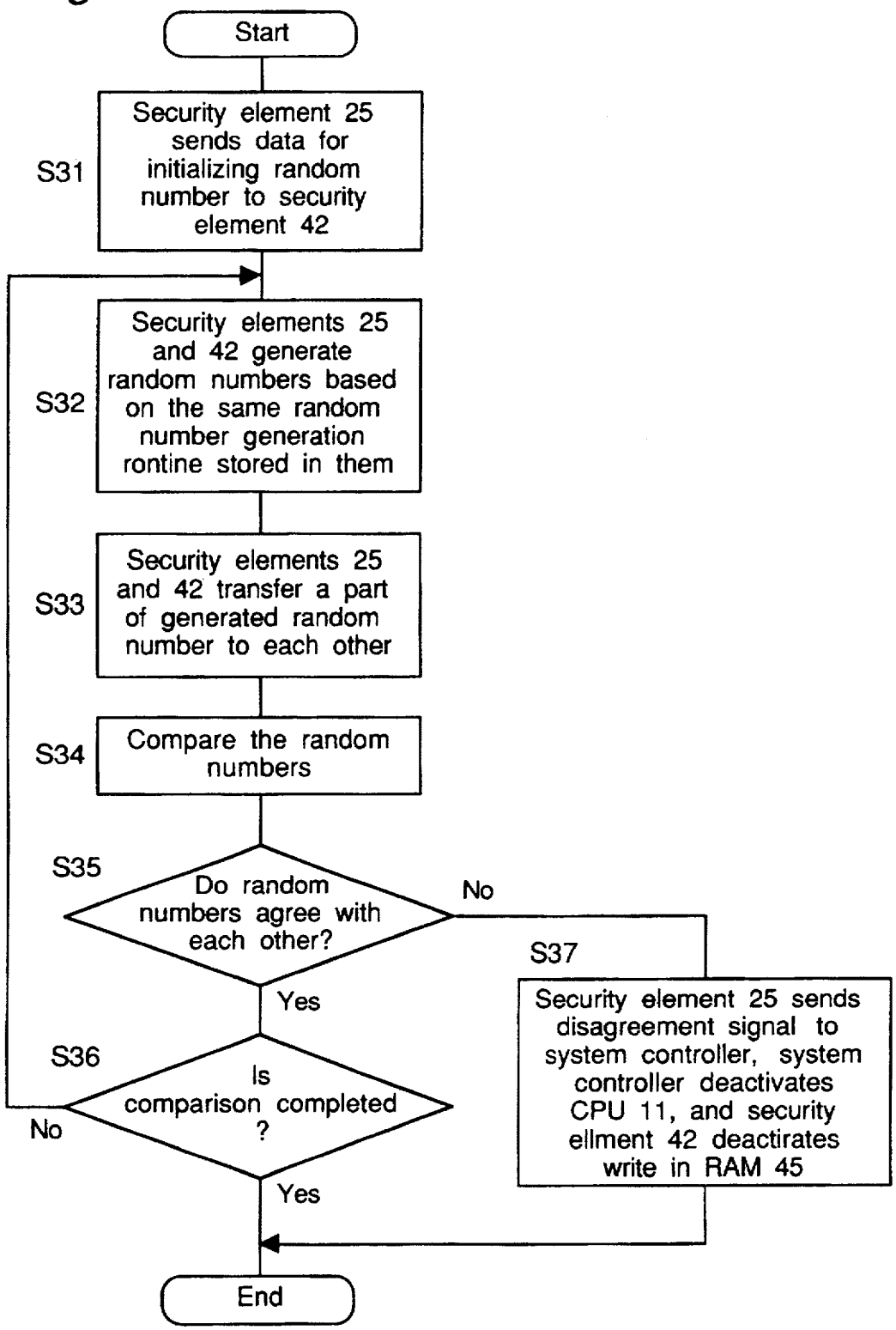
FIG. 6 is a flowchart for identifying the other party.

In FIG. 6, at step S31, the second security element 25 sends initial data for generating random numbers to the first security element 42. At step S32, the two security elements 25 and 42 generate one or more data of random number based on the same initial data. At step S33, the second security element 25 transfers a half of the generated random number data to the other party 42, while the other security element 42 transfers the other half of the generated random number data to the other party 25. At step S34, the security elements 25 and 42 compare and check the received data with those generated by themselves. At step S35, it is decided if the result of the comparison shows the prescribed relation of the data such as agreement. If it is decided that the agreement of the data or the like is confirmed, the flow proceeds to step S35 to decide if the comparison and check is performed at prescribed times. If it is decided that the comparison and check are not repeated the prescribed times, the flow returns to step S32 so as to repeat the operation of steps S32–36. At step S36, if it is decided that the comparison and check is repeated the prescribed times, the flow of the identification completes.

On the other hand, if it is decided at step S35 that the result of the comparison does not show the agreement of the data, the second security element 25 sends a signal of the disagreement to the system controller 32. Then, the system controller 32 disables the CPU 11 to prohibit the read of the data in the CD-ROM 41. In this case, a message may be displayed on a picture plane of the television set 2 to warn that the picture processing and/or audio processing cannot be conducted by using the data in the CD-ROM 41. Alternately, the system controller 32 may sends a signal to the first security element 42 to prohibit the write of the back-up data in the RAM 45.

After the completion of the identification of the other party shown in FIG. 6, the flow proceeds to step S14 in FIG. 5. At step S14, the system controller 32 reads a name address data stored in the area 441 in the ROM 44, and reads a second name data at an address in the CD-ROM 41 in correspondence to the name address by controlling the drive controller 23 and writes the second name data in the storage area 334. At step S15, the system controller 32 sends the second name data stored temporarily in the storage area 334 via the drive controller 23, the second security element 25, the contacter 26, the contacter 47 and the logic circuit 43 to the first security element 42. Then, at step S16, the first security element 42 compares and checks the receive name data with the first name data stored in the area 442 in the ROM 44 and decides if the two data have a prescribed relation such as the agreement of the two data to each other. If it is decided that the two data have the prescribed relation with each other, the first security element 42 sends an agreement signal to the second security element 25 at step S17. At step S18, the second security element 25 sends the agreement signal to the system controller 32 and resets the first security element 42 thereafter continuously. The second security element 25 may identify the other party again after the comparison because this makes it more difficult to analyze which is the name data among the above-mentioned input and output data. At step S19, the system controller 32 reads a part of the picture data, the audio data and the program data (that is, data within the storage capacity of the main RAM 33) optically with the pick up 21. These data demodulated by the CD-ROM demodulator 22, decoded by the decoder 31 and written in the main RAM 33. Then, CPU 11 starts the game processing as shown in FIG. 7 by accessing the main RAM 33.

On the other hand, at step S16, it is decided that the disagreement (or the non-existence of the prescribed relation) of the two name data exists, the flow proceeds to step S20. At step S20, the first security element 42 sends a disagreement signal to the second security element 25. At step S21, the second security element 25 sends the disagreement signal to the system controller 32 and resets the first security element 42 thereafter continuously. At step S22, the system controller 32 sends an error code to the CPU 11, and the CPU 11 is disabled so as not to conduct picture processing and the like based on the data read from the CD-ROM 41. In concrete, the CPU 11 displays an error message on the television set 2 to warn a user that the optical disk cartridge 40 cannot be used.

Figure 7:
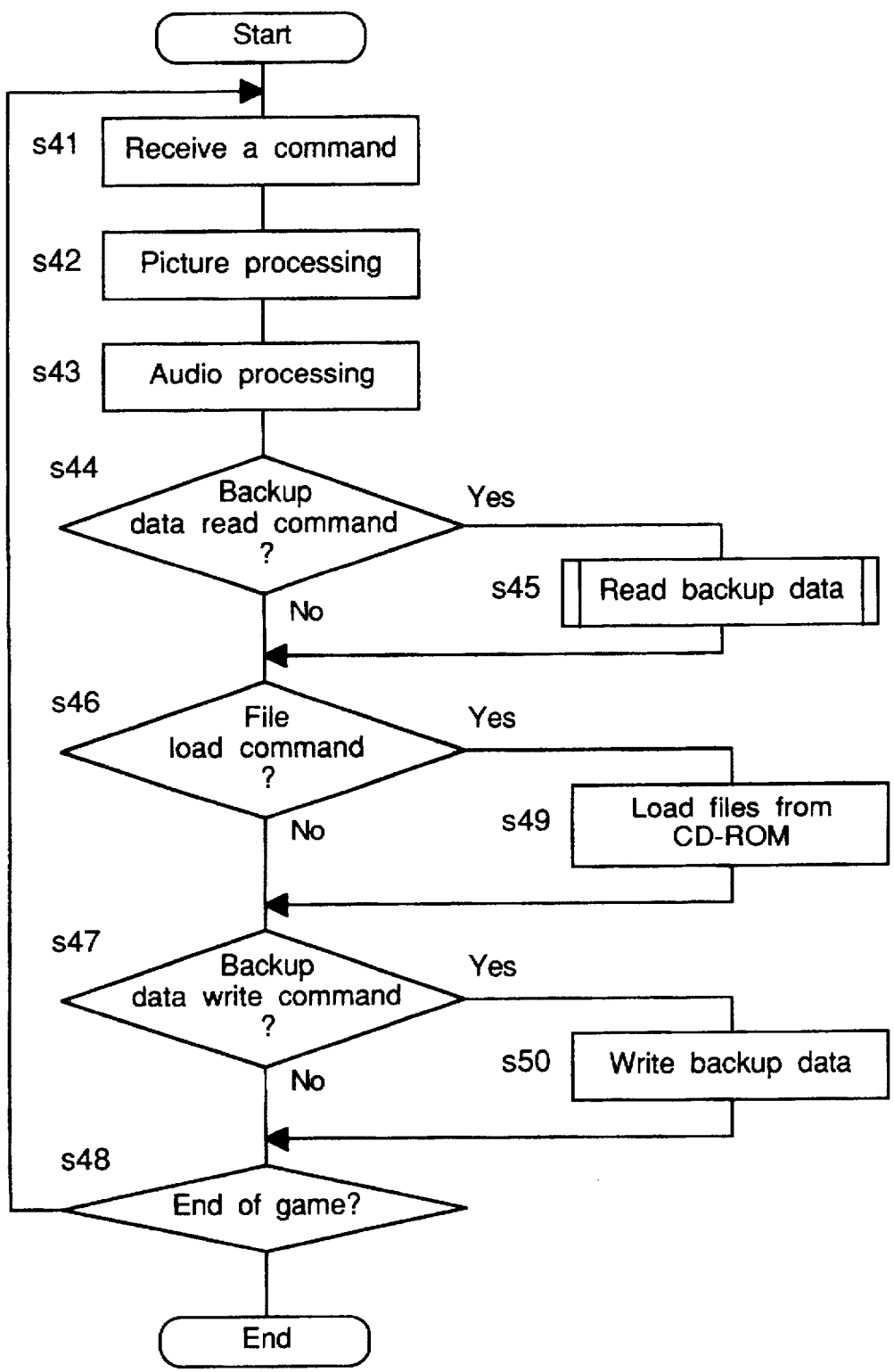
FIG. 7 is a flowchart for performing for the very object to be used (main routine) of CPU 11.
Figure 8:
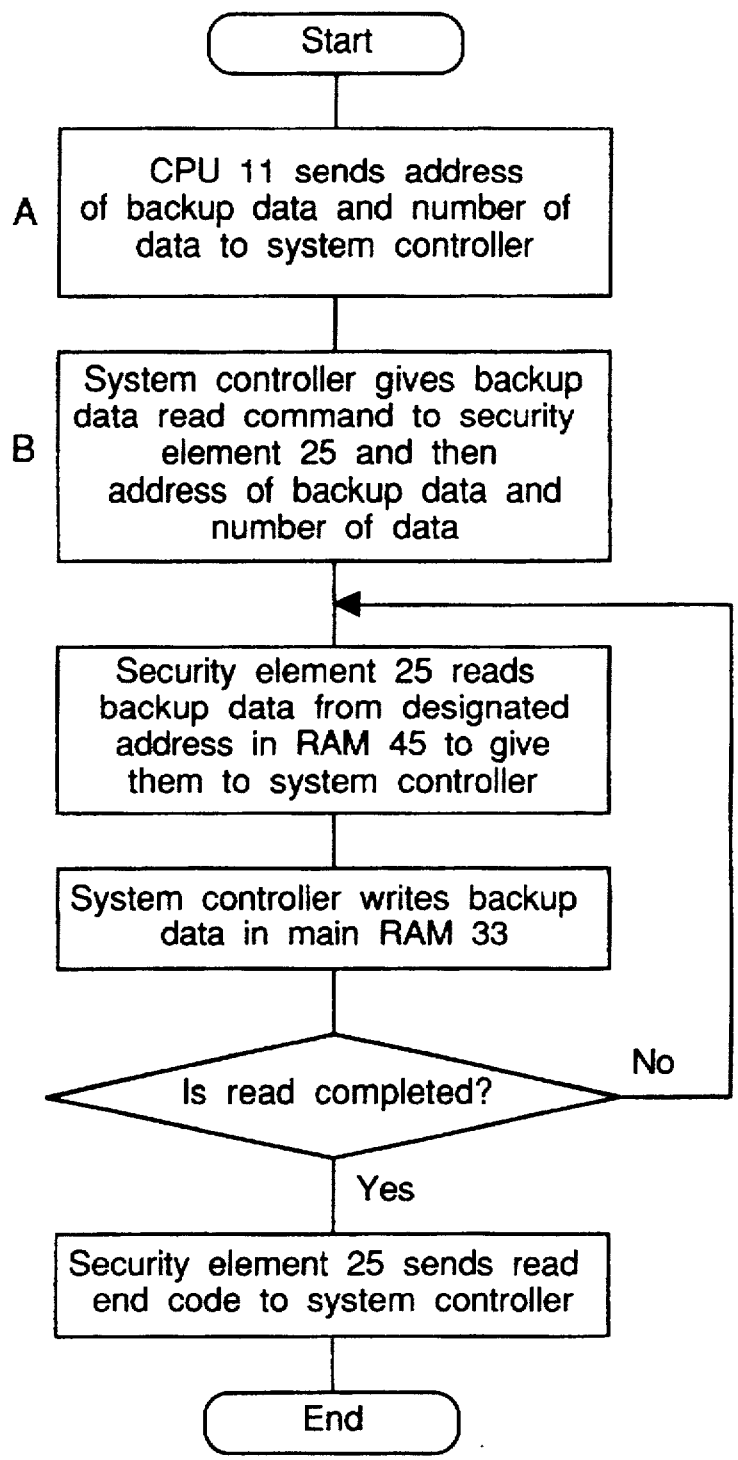
FIG. 8 is a flowchart for controlling read of backup data.

FIG. 7 shows a flowchart for performing for the inherent object to be used (main routine) of CPU 11. Because the information processing system of the present embodiment is a video game machine, the inherent processing relates the processing of a game itself. Next, by referring FIG. 7, an example is explained of game processing such as picture processing and audio processing to which the present invention is applied. At step S41, a player inputs a command by operating the joy stick 1 to select a game mode displayed on the picture plane of the television set 2. At step S42, the CPU 11 conducts processing for the game or the like based on the program data stored temporarily in the main RAM 33, while the picture processing unit 12 generates picture signals for the game based on picture data. At step S43, the audio processing unit 13 generates audio signals based on audio signals. Thus, a game proceeds by displaying image signals based on the picture on the television set 2 with audio signals. At step S44, it is decided if a command to be processed is a read command of backup data. If a player wants to restart the game by using the back up data (for example, points, lives or the present situation) at the end of the previous play, the read command of back up data is generated, and the flow proceeds to step S45. At step S45, the CPU 11 reads the data in the midst of the game stored in the RAM 45 in the cartridge case 48, and stores them in the storage area 335 as a working area. The control of reading back up data is shown in detail in a flowchart of FIG. 8, but detailed explanation thereof is omitted here.

On the other hand, at step S44, if the command for reading the back up data does not exist, the flow proceeds to step S46. It is decided at step S46 if a file load command does not exist, and it is decided at step S47 if a write command of back up data does not exist. If it is decided at step S48 that the game is not over, the flow returns to step S41 to repeats the processings of steps S41, S46–S48. Thus, the CPU 11, picture processing unit 12 and audio processing unit 14 conduct the processing for the game based on the data stored temporarily in the main RAM 33. If the processing in correspondence to the storage capacity of the main RAM 33 (for example 1 megabytes) is conducted, a file load command is detected at step S46 because the file load command is written at the end of the program. Then, the CPU 11 proceeds to step S49 to read picture data, audio data and program data (of total of 1 megabytes) necessary for the next game processing and to write them in the storage areas 331–333 in the main RAM 33. These processings are similar to the above-mentioned processings of steps S19 and S14–S19.

At step S47, if a write command of back up data is decided to be detected, a write processing of backup data is conducted at step S50. If an optical disk cartridge 40 is constructed and the backup data are written as in this embodiment, even when a CD-ROM 41 is inserted in an optical disk cartridge 40 for a different game, it can be prevented that backup data of the different game is written erroneously in the RAM 45 in the optical disk cartridge 40 not in correspondence to the backup data. Then, at step S48, if it is decided that the game is over or that the player presses the end switch to instruct the end of the game, the game processing completes.

In the embodiment explained above, the image processor 10, the optical reproduction unit 20 and the system cartridge 30 are contained in different housings, because it is assumed that the optical reproduction unit 20 and the system cartridge 30 are sold later to connect them to a video game machine, as a part of the information processing system, which has been bought by a user previously.

As explained above, the present invention makes it possible to use only a legitimate secondary storage device which has a prescribed relation with a case thereof among secondary storage devices which can be contained in the cartridge case. Thus, illegitimate reproduction of a secondary storage medium can be prevented effectively.

In the above-mentioned embodiment, a CD-ROM 40 is explained as an example of a disk-like medium. However, other disk-like media to which the invention can also be applied to include a magnetic disk such as a flexible disk and an optical disk such as a digital versatile disk of RAM type (DVD-RAM) or a magneto-optical disk (MO) which can be used to write and read by a user.

For example, when a magnetic disk is used as a disk-like medium, in FIG. 2, the pick up 21 comprises a magnetic head, and a magnetic disk is used instead of the CD-ROM 40. Further, the CD-ROM demodulator 22 and the CD-ROM decoder 31 are replaced with a magnetic disk demodulator and a magnetic disk decoder. The pick up 21 comprising a magnetic head not only reads information written from the magnetic disk, but also it writes information thereto. Then, if a magnetic disk is used as a disk-like medium, image data recorded in the magnetic disk can be changed without taking it out from the disk cartridge 40.

A change in a magnetic disk or rewrite to the magnetic disk is performed in a qualified factory according to following procedures: With reference to FIG. 2, the secondary security element (D-CIM) 25 interchanges information with the first security element (C-CIM) 42 through the contacter 26, the contacter 47 and the logic circuit 43, and the secondary security element (D-CIM) 25 and the first security element (C-CIM) 42 confirm each other that the other party is a legitimate party. When the D-CIM 25 and the C-CIM 42 confirm each other that the other party is a legitimate party, the D-CIM 25 instructs the C-DIM 42 to control the logic circuit 43 for write enable for writing data from the D-CIM 25 to the RAM 45. However, it is determined that this instruction is only generated by the D-CIM 25 in an information processor which is provided in the factory which produces the disk cartridges 40, and D-CIM 25 in information processors which can be bought by users or counterfeiters cannot generate the instruction.

In FIG. 2, the D-CIM 25 in an information processor provided in the factory receives image data to be written to the magnetic disk and a write track and a write sector of the image data, from the CPU 11 through the drive controller 23 and the like. The D-CIM 25 sends any one of the image data, the write track and the write sector among them according to a random number generated by itself to the RAM 45. The image data sent from the D-CIM 25 to the RAM 45 corresponds to the third data of the invention, and the write track and the write sector sent from the D-CIM 25 to the RAM 45 corresponds to the fourth data. The third data may be check sum data obtained by conversion by the D-CIM 25.

On the other hand, according to the image data, the write track and the write sector from the CPU 11, the drive controller 23 and the magnetic head cooperate with each other to write the image data to the magnetic disk. The image data corresponds to the first data of the invention. The image data written to the magnetic disk on an instant when the image data, the write track and the write sector are written by the D-CIM 25 to the RAM 45.

As described above, in the factory, the third and fourth data are written to the RAM 45 at the same time as the image data or the first and second data are written to the magnetic disk. Therefore, the third data in the RAM 45 has a prescribed relation to the first and second data in the magnetic disk each other. Therefore, the disk cartridge and the magnetic disk contained therein has a prescribed relation to each other. Thus, when a magnetic disk produced in the factory is used by a user, the C-CIM 42 can decide whether the second data in the magnetic disk has the prescribed relation to the third data in the RAM 45 or not, or whether the magnetic disk is a legitimate disk or not.

Next, another case is explained when a counterfeiter or the like writes an image data or a game program popular in the market to a magnetic disk recording an image data or a game program not popular in the market in a factory other than the qualified factories. When the counterfeiter writes image data to the magnetic disk, write procedures similar to those in the qualified factory are performed basicly. Differences in the qualified factory and in the other relate to the D-CIM 25. That is, the D-CIM in the factory can send the above-mentioned special instruction to control the logic circuit 43 for write enable for writing data from the D-CIM 25 to the RAM 45. On the contrary, the D-CIM which generates the special instruction is only provided in the qualified factory, and a user or a counterfeiter cannot buy it. Therefore, the D-COM 25 of the counterfeiter cannot generate the special instruction. Then, even if the D-CIM 25 and the C-CIM 42 confirm each other that the other party is a legitimate party, the logic circuit 43 cannot be controlled for write enable so that data from the D-CIM 25 is written to the RAM 45. Therefore, even if the magnetic head rewrites image data in the magnetic disk or the first and second data, the third and fourth data having the prescribed relation thereto cannot be written to the RAM 45.

As described above clearly, if the image data in the magnetic disk is rewritten outside the qualified factories, the second and third data do not have the prescribed relation to each other. Then, the C-CIM 42 decides whether the magnetic disk is a legitimate disk or not.

A magnetic disk is explained above as a disk-like medium, a similar situation occurs when an optical disk such as a magneto-optical disk (MO) or a digital versatile disk (DVD-RAM) is produced and a counterfeiter rewrites image data therein. Then, detailed explanation in such a case is not explained here to avoid duplicated explanation.

Figure 9:
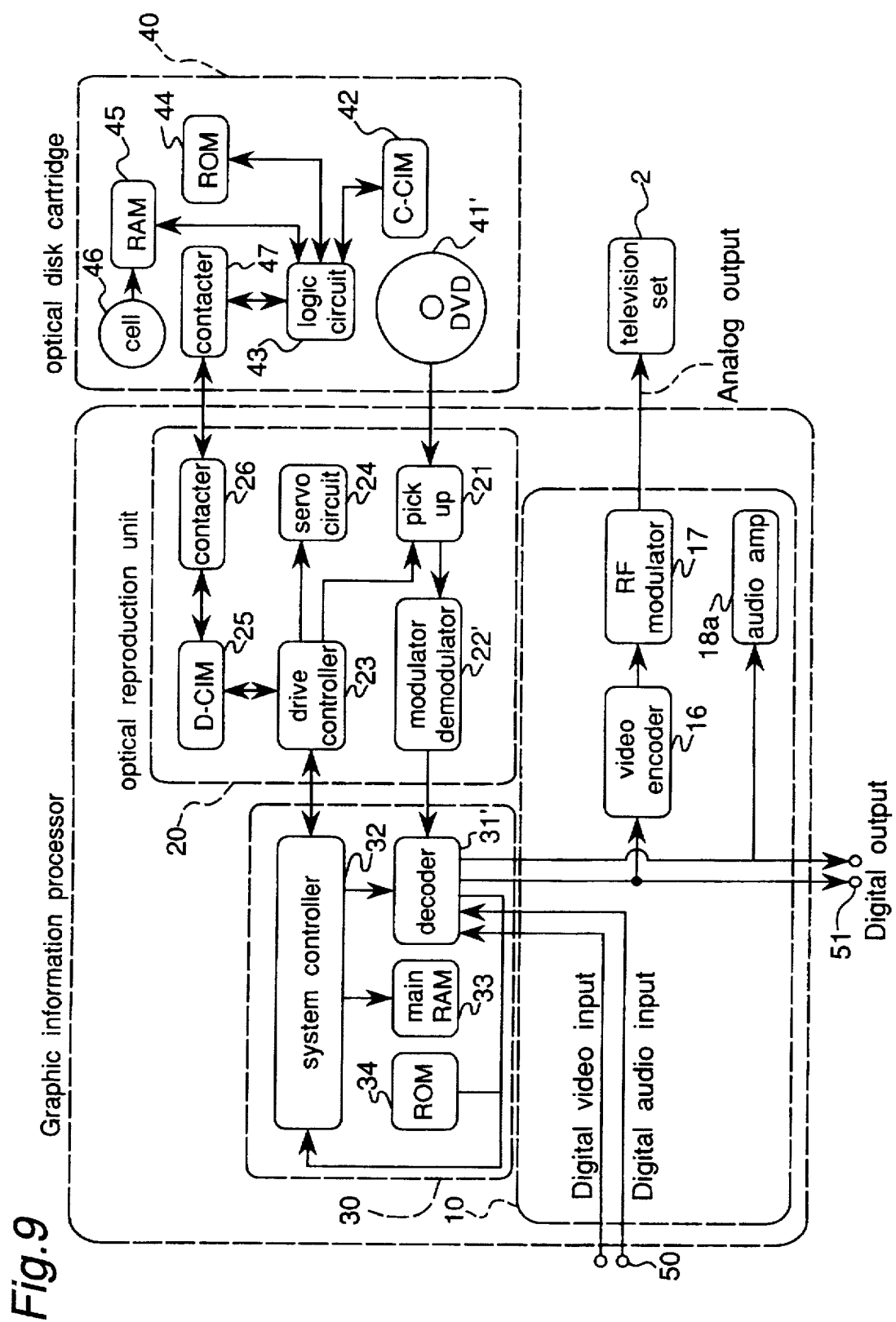
FIG. 9 is a block diagram of a graphical processing system of a second embodiment of the invention.

Next, a case is explained when a digital video disk is used not for the information processor described above, but for a graphic information processor such as an optical disk player as shown in FIG. 9. A system controller 32 controls reproduction as a main processing in such a graphic information processor.

In the graphical image processor shown in FIG. 9, an image processor 10' is different from the image processor shown in FIG. 2. Digital video input signals and digital audio input signals received at terminals 50 are sent to a decoder 31' in a system cartridge 30', while the decoder 31' outputs digital video signals and digital audio signals at terminals 51. A modulator/demodulator 22' in an optical reproduction unit 20 is connected between the decoder 31' and a pickup 21. A digital versatile disk (DVD) 41' is contained in an optical disk cartridge 40'. The digital audio signals are amplified by an audio amplifier 18a. The digital video signals are also converted through a video encoder 16 and an RF modulator 17 to analog output signals to be received by a television set 2.

As is well known, a video cassette program such as a movie recorded in a video tape can be copied easily by combining two video cassette players. Then, video program makers for recording programs in video cassettes suffered a great loss. However, because video cassettes record analog image data, image data are deteriorated remarkably as copying is repeated and cannot be enjoyed. Thus, a loss of the makers is suppressed to a certain level. However, because an optical disk such as DVD records digital image data, image data are not deteriorated remarkably as copying is repeated, and copying can be repeated infinitely. Then, a loss of makers will be very large.

Then, if the third data is stored in an nonvolatile memory in a case containing a digital video disk as explained above, a digital video disk copying illegitimately image data or a movie is inactivated, and a right of the makers can be protected.

On the other hand, the graphic information processor as shown in FIG. 9 can be used to record a television program through a television antenna (not shown). Then, another instruction may be added to the D-CIM 25 for instructing to the C-CIM 42 to control the logic circuit when signals from the television antenna are recorded. However, the D-CIM 25 does not send the instruction to the C-CIM 25 when it is detected that image data signals are recorded through the digital input terminals 50. Thus, it is prevented that a user copies a television program infinitely.

Further, in a modified way, times of copying of image data can be limited. For example, it is assumed that the RAM 45 in FIG. 9 stores 3 of times of copying. Then, when the image data in the DVD 41', the times of copying, 3, read from the RAM 45 is added at the top of digital video signals output to the digital output terminals 51 through the pickup 21, the modulator/demodulator 22' and the decoder 31'. When the digital video data having the times of copying at the top thereof is received at the digital input terminals 50, the digital video signals are separated by the decoder 31' into the image data and the times of copying. The image data are copied in the DVD 41', through the modulator/demodulator 22' and the pickup 21'. The times of copying, 3, is sent through the drive controller 23 to the D-CIM 25. The D-CIM 25 decreases it by one, and the times of copying of 2 is written to the RAM 45. At the same time, the D-CIM 25 writes the third and fourth data to the RAM 45.

If the times of copying becomes to zero when the D-CIM 25 decreases the times of copying, the D-CIM 25 does not generate the instruction to the C-CIM 42 to control the logic circuit 43. Therefore, the times of copying and the third and fourth data are not written to the RAM 45. Thus, the second data in the DVD 41' does not have the prescribed relation to the third data in the RAM 45, and the reproduction of the image data illegitimately copied in the DVD 41' is disabled.

As explained above, the invention prevents a use of an illegitimately copied disk-like recording medium or limits the times of copying of a disk-like recording medium.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information processing system comprising an information processor and a storage device which is removably connected to the information processor, said storage device comprising:

a disk-like storage medium, to which a user may write or rewrite data, for storing a first data, processed by the information processor and including at least image data, and a second data for deciding legitimacy of the image data;

a case which contains the disk-like storage medium;

a non-volatile storage device for storing a third data having a predetermined relationship with the second data and storing a fourth data for identifying a location in the disk-like storage medium, at which the second data is stored; and a first checking circuit for determining a predetermined relationship between the second and third data;

said information processor comprising:

a random access memory for writing and reading data;

a central processor for performing image processing according to the image data stored in the random access memory;

write and read circuitry for reading the first data, for reading the second data stored in the disk-like storage medium in accordance to the fourth data stored in the non-volatile storage device and for writing the first data and the second data to the random access memory; and an activation circuit for enabling the central processor to perform processing according to the first data when the first checking circuit decides according to the second data stored in the random access memory and the third data stored in the non-volatile storage device that the predetermined relationship exists, said disk-like storage medium comprising an optical storage device, said secondary storage device case enclosing said disk-like storage medium, and housing said non-volatile storage device and said first checking circuitry, said read circuitry comprising optical reproduction circuitry for optically reading storage data in said optical storage medium.

2. The information processing system according to claim 1, wherein said disk-like storage medium is a magnetic disk.

3. The information processing system according to claim 1, wherein said disk-like storage medium is an optical disk which data can be written to and read from.

4. The information processing system according to claim 3, wherein said information processing system is an image reproduction system which reproduces the first data read from the optical disk read by said write and read means as image data for luster scan display.

5. The information processing system according to claim 2, wherein said third data comprises name code data on the disk-like storage medium.

6. The information processing system according to claim 2, wherein said predetermined relationship comprises complete agreement of said third data with said second data.

7. The information processing system according to claim 2, wherein a check sum operation is performed on each of said second data and said third data and wherein said predetermined relationship requires the agreement of a check sum of the third data and a check sum of said second data.

8. The information processing system according to claim 1, wherein said random access memory comprises a first area for storing the first data and a second area for storing the second data, the second area having a smaller capacity than the first area, and said main storage means has a capacity smaller than the first area.

9. The information processing system according to claim 1, wherein said main storage means comprises a random access memory.

10. A disk-like storage device which is removably connected to an information processor, said information processor comprising:

a main storage device for reading and writing data;

a central processor for performing image processing according to the data stored in the main storage device;

write and read circuitry for reading data from and writing data to said main storage device;

a control circuitry for controlling the write and read circuitry; and an activation circuit for enabling the central processor to perform image processing;

said disk-like storage device comprising:

a disk-like storage medium, to which a user may write or rewrite data, for storing first information data processed by the information processor and second data for checking the authenticity of the first information data, said first information data including at least image data;

a case which can encloses the disk-like storage medium;

a non-volatile storage device for storing a third data having a predetermined relationship with said second data and a fourth data for identifying the location in the disk-like storage medium at which the second data is stored; and a first checking circuitry for determining the existence of said predetermined relationship between the second and third data;

said disk-like storage medium comprising an optical storage device, said secondary storage device case enclosing said disk-like storage medium, and housing said non-volatile storage device and said first checking circuitry, said read circuitry comprising optical reproduction circuitry for optically reading storage data in said optical storage medium;

said control circuitry causing said write and read circuitry to read the second data from the disk-like storage medium, said activation circuitry enabling said central processor to perform image processing in accordance with the first data in response to a determination by the first checking circuitry that the predetermined relationship exists between the second data and the third data stored in said non-volatile storage device.

11. The information processing system according to claim 10, wherein said disk-like storage medium is a magnetic disk.

12. The information processing system according to claim 10, wherein said disk-like storage medium is an optical disk which data can be written to and read from.

13. The information processing system according to claim 12, wherein said information processing system is an image reproduction system which reproduces the first data read from the optical disk read by said write and read circuitry as image data for luster scan display.

14. The information processing system according to claim 11, wherein said third data comprises a name code data.

15. The information processing system according to claim 11, wherein said predetermined relationship comprises complete agreement between said third data and said second data.

16. The information processing system according to claim 11, wherein a check sum operation is performed on each of said second data and said third data and said predetermined relationship requires the agreement of a check sum of the third data and said second data.

* * * * *